(12) United States Patent
Agrawal et al.

(10) Patent No.: US 10,862,888 B1
(45) Date of Patent: *Dec. 8, 2020

(54) LINKING A FORWARDED CONTACT ON A RESOURCE TO A USER INTERACTION ON A REQUESTING SOURCE ITEM

(71) Applicant: Google LLC, Mountain View, CA (US)

(72) Inventors: Anurag Agrawal, Palo Alto, CA (US); Anshul Kothari, Cupertino, CA (US); Daniel Andersson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,583

(22) Filed: Apr. 29, 2019

Related U.S. Application Data

(63) Continuation of application No. 15/804,741, filed on Nov. 6, 2017, now Pat. No. 10,305,899, which is a continuation of application No. 14/178,447, filed on Feb. 12, 2014, now Pat. No. 9,819,678, which is a continuation of application No. 14/069,160, filed on Oct. 31, 2013, now Pat. No. 8,732,322.

(51) Int. Cl.
*G06F 15/16* (2006.01)
*H04L 29/06* (2006.01)

(52) U.S. Cl.
CPC .............................. *H04L 63/0876* (2013.01)

(58) Field of Classification Search
CPC .. G06Q 30/241; G06Q 30/251; G06Q 30/245; G06Q 30/273; G06Q 30/242
See application file for complete search history.

(56) References Cited

U.S. PATENT DOCUMENTS

| | | | |
|---|---|---|---|
| 7,424,442 B2 | 9/2008 | Wong et al. | |
| 7,848,499 B2 | 12/2010 | Michonski | |
| 8,140,389 B2 | 3/2012 | Altberg et al. | |
| 8,200,534 B2 | 6/2012 | Wong et al. | |
| 8,504,426 B2 | 8/2013 | Petta | |
| 8,577,016 B1 | 11/2013 | Duva et al. | |
| 8,725,561 B1 * | 5/2014 | Chatterjee | G06Q 90/00 705/14.1 |
| 8,732,322 B1 * | 5/2014 | Agrawal | H04L 63/0876 709/228 |
| 9,406,076 B1 * | 8/2016 | Agrawal | H04L 47/828 |
| 9,819,678 B1 * | 11/2017 | Agrawal | H04L 63/0876 |
| 10,305,899 B1 * | 5/2019 | Agrawal | G06Q 30/0251 |

(Continued)

*Primary Examiner* — Douglas B Blair
(74) *Attorney, Agent, or Firm* — Fish & Richardson P.C.

(57) ABSTRACT

Methods, systems, and apparatus include computer programs encoded on a computer-readable storage medium, including a method for providing content. An initial request for a resource is received. A determination is made when fixed or recyclable contact information should be provided with the resource, wherein the contact information is associated with a content sponsor that sponsored the resource. When recyclable contact information should be provided, first recyclable contact information for the content sponsor and time-out information are identified. The first recyclable contact information and the time-out information are combined in an identifier. The identifier is stored on the requesting device and the resource is provided including the first recyclable contact information responsive to the initial request.

17 Claims, 4 Drawing Sheets

(56) References Cited

U.S. PATENT DOCUMENTS

| | | | |
|---|---|---|---|
| 10,462,090 B1* | 10/2019 | Le Jouan | H04L 67/20 |
| 2005/0251445 A1* | 11/2005 | Wong | G06Q 30/02 |
| | | | 705/14.69 |
| 2007/0064889 A1 | 3/2007 | Michonski | |
| 2007/0121848 A1 | 5/2007 | Faber et al. | |
| 2007/0124206 A1* | 5/2007 | Faber | G06Q 30/02 |
| | | | 705/14.46 |
| 2007/0124207 A1 | 5/2007 | Faber et al. | |
| 2007/0143182 A1* | 6/2007 | Faber | G06Q 30/02 |
| | | | 705/14.71 |
| 2008/0126209 A1 | 5/2008 | Wong et al. | |
| 2008/0275785 A1* | 11/2008 | Altberg | G06Q 30/02 |
| | | | 705/14.54 |
| 2009/0282433 A1* | 11/2009 | Petta | G06Q 30/02 |
| | | | 725/32 |
| 2011/0166938 A1 | 7/2011 | Deridder et al. | |
| 2013/0018712 A1 | 1/2013 | Wong et al. | |
| 2013/0197995 A1* | 8/2013 | Skog | H04M 3/2218 |
| | | | 705/14.45 |
| 2014/0074596 A1* | 3/2014 | Kolluri | G06Q 30/02 |
| | | | 705/14.45 |

\* cited by examiner

LINKING A FORWARDED CONTACT ON A RESOURCE TO A USER INTERACTION ON A REQUESTING SOURCE ITEM

CROSS-REFERENCE TO RELATED APPLICATIONS

This application is a continuation of, and claims priority to, U.S. application Ser. No. 15/804,741, filed on Nov. 6, 2017, which is a continuation of U.S. application Ser. No. 14/178,447, filed on Feb. 12, 2014, which is a continuation of U.S. application Ser. No. 14/069,160, filed on Oct. 31, 2013. The disclosures of the prior applications are considered part of and are incorporated by reference in the disclosure of this application.

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented. A user interaction that occurs after presentation of content can be related to a different user interaction on subsequently-presented content.

SUMMARY

In general, one innovative aspect of the subject matter described in this specification can be implemented in methods that include a computer-implemented method for providing content. The method includes receiving a script for execution when a resource is rendered on a client device. The method further includes storing the script in association with the resource. The method further includes receiving an initial request for the resource, the initial request including a token that identifies a requesting source item that was interacted with by a user to generate the initial request. The method further includes executing the script. Executing the script includes determining, by one or more processors, when fixed or recyclable contact information should be provided with the resource, wherein the contact information is associated with a content sponsor that sponsored the resource. Executing the script further includes when recyclable contact information should be provided, requesting recyclable information from a service including providing the token to the service. Executing the script further includes receiving, from the service, first recyclable contact information for the content sponsor and time-out information. Executing the script further includes storing the first recyclable contact information and the time-out information in an identifier. Executing the script further includes storing the identifier on the requesting device and providing the resource including the first recyclable contact information responsive to the initial request.

These and other implementations can each optionally include one or more of the following features. The resource can be a landing page, and the initial request can be generated by an interaction by the user with an advertisement that includes a link to the landing page. The request can include a URL for the landing page with the token appended thereto. The token can identify an impression of the requesting source item. The identifier can be a cookie that is stored on the requesting device and read when subsequent requests for the resource are processed by the requesting device. The method can further include receiving a second request for the resource including receiving the cookie, determining when a time between the initial request and the second request is less than a first time specified in the time-out information and less than a predetermined short time, and when the time between is less than both, providing the first recyclable contact information along with the resource responsive to the second request, wherein the predetermined short time is less than a time associated with the time-out information. The method can further include, when the time is less than the first time specified in the time-out information but more than the predetermined short time, requesting new recyclable contact information from the service, receiving the new recyclable contact information, storing the new recyclable contact information and the time-out information in the cookie, providing the cookie to the requesting device for storage on the requesting device, and providing the resource including the new recyclable contact information responsive to the second request. The method can further include returning the first recyclable contact information to a pool of available contact information selections that are associated with the content sponsor. The method can further include attributing requests after the initial request for the resource within a time specified by the time-out information to the initial request and associated interaction by the user with the requesting source item. The method can further include, when it is determined that fixed contact information should be provided, providing the resource along with a telephone number associated with the content sponsor that is provided by the content sponsor. The first recyclable contact information can be a recyclable telephone number and wherein providing the resource includes providing the recyclable telephone number for display in the resource. The time associated with the time-out information can be selectable by the content sponsor. Storing the script further includes identifying a telephone number in the resource and replacing the telephone number with a function call to call the service and request recyclable contact information rather than present the telephone number. Requesting recyclable information from a service can include providing a unique key associated with the content sponsor along with the token to the service. The token can include information used to securely verify that the token was generated for the resource, the token can identify a content sponsor and an allocation profile, and the token can be encrypted and signed with a symmetric cypher.

In general, another innovative aspect of the subject matter described in this specification can be implemented in computer program products that include a computer program product tangibly embodied in a computer-readable storage device and comprising instructions. The instructions, when executed by one or more processors, cause the processor to: receive a script for execution when a resource is rendered on a client device; store the script in association with the resource; receive an initial request for the resource, the initial request including a token that identifies a requesting source item that was interacted with by a user to generate the initial request; and execute the script including: determining, by one or more processors, when fixed or recyclable contact information should be provided with the resource, wherein the contact information is associated with a content sponsor that sponsored the resource; when recyclable contact information should be provided, requesting recyclable information from a service including providing the token to the service; receiving, from the service, first recyclable contact information for the content sponsor and time-out information; storing the first recyclable contact information and the time-out information in an identifier; and providing the identifier to a requesting device for storage on the requesting device and providing the resource including the first recyclable contact information responsive to the initial request.

These and other implementations can each optionally include one or more of the following features. The resource can be a landing page and the initial request can be generated by an interaction by the user with an advertisement that includes a link to the landing page. The request can include a URL for the landing page with the token appended thereto. The token can identify an impression of the requesting source item.

In general, another innovative aspect of the subject matter described in this specification can be implemented in systems, including a system for providing content. The system includes one or more processors and one or more memory elements including instructions that, when executed, cause the one or more processors to: receive a script for execution when a resource is rendered on a client device; store the script in association with the resource; receive an initial request for the resource, the initial request including a token that identifies a requesting source item that was interacted with by a user to generate the initial request; and execute the script including: determining, by one or more processors, when fixed or recyclable contact information should be provided with the resource, wherein the contact information is associated with a content sponsor that sponsored the resource; when recyclable contact information should be provided, requesting recyclable information from a service including providing the token to the service; receiving, from the service, first recyclable contact information for the content sponsor and time-out information; storing the first recyclable contact information and the time-out information in an identifier; and providing the identifier to a requesting device for storage on the requesting device and providing the resource including the first recyclable contact information responsive to the initial request.

Particular implementations may realize none, one or more of the following advantages. Content (e.g., advertisement) impressions that lead to a subsequent call to a content sponsor can be linked so as to enable detailed call reporting that is tied to an impression. Content sponsors can be provided with reports and metrics that are more detailed, e.g., down to the ad impression level. In systems sharing contact information resources (e.g., shared telephone number pool systems), smaller pools of forwarding telephone numbers can be sufficient for each supported entity (e.g., an advertiser) because forwarding numbers can be released and reused after a time-out period. Tokens provided in response to received requests for content in the proposed systems can be used to protect against malicious attacks on a resource.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
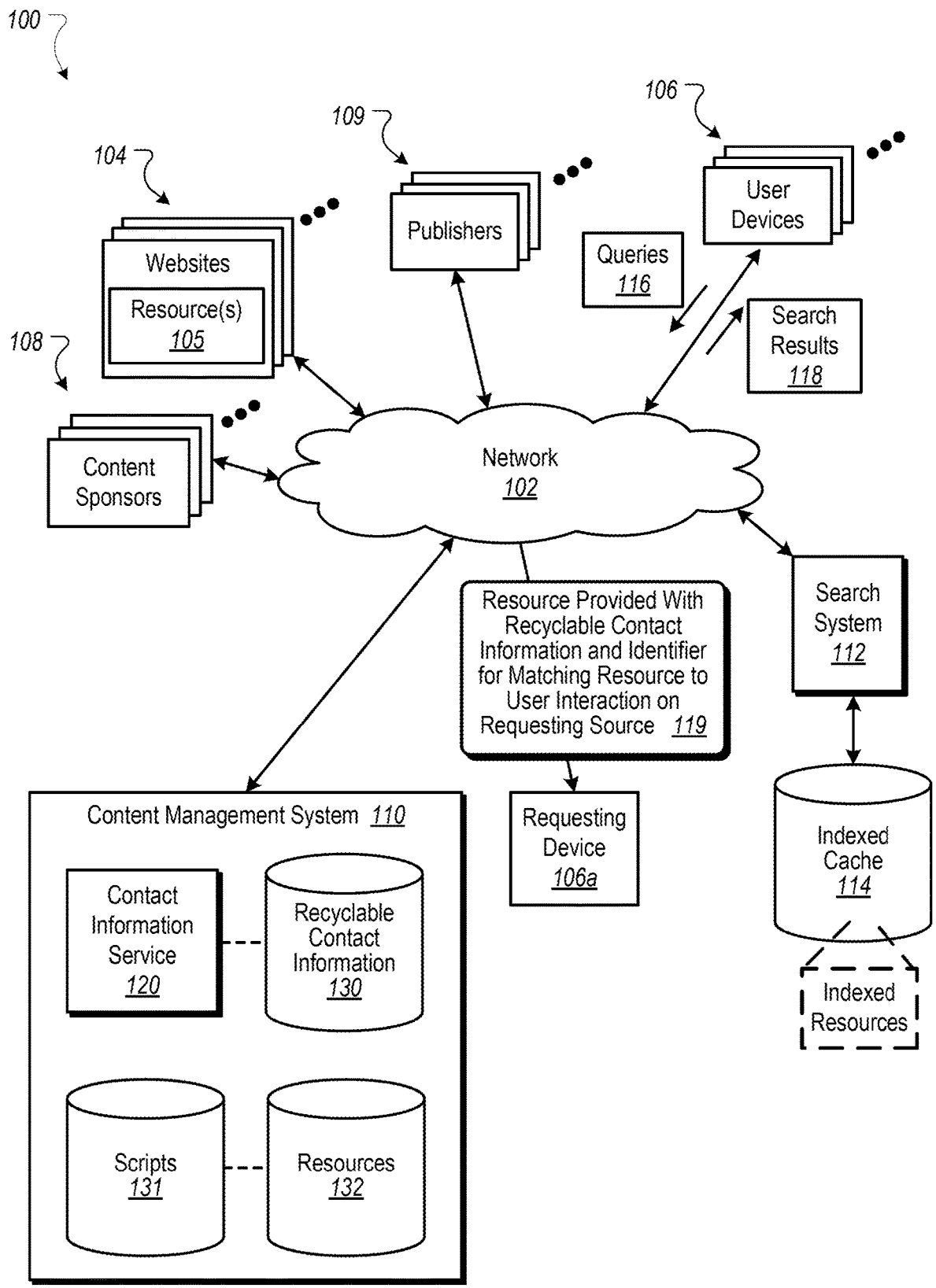
FIG. 1 is a block diagram of an example environment for delivering content.

This document describes systems, methods, computer program products and mechanisms for assigning a forwarding telephone number dynamically when a user visits a website (e.g., landing page) after interacting with (e.g., clicking on) content (e.g., an advertisement). Information about the assignment can be used, for example, to associate an advertisement impression with a telephone call made by a user after presentation of the landing page associated with the advertisement. For example, an association can be maintained between an impression (e.g., of an advertisement) and the telephone number (the forwarding number) that is dynamically assigned and presented as part of a landing page that is presented to the user. An initial call to the telephone number (the forwarding number) can be routed to the content sponsor. If the same user calls again, for example within a predetermined time period, the user will again get connected to the same content sponsor. Once used, the telephone number can be reassigned, for example, to another advertisement associated with the same content sponsor, which can reduce the amount of forwarding telephone numbers that are needed to be associated with a single content sponsor. Similarly, the telephone number can also be reassigned to another different content sponsor. Calls can be associated, for example, back to the ad click even if the user makes the first call (or a subsequent call) several days after first click.

In some implementations, a content sponsor (e.g., an advertiser) can decide whether to use dynamic assignment for a particular landing page. If so, then the content sponsor can be provided with a script that the content sponsor can embed within the landing page (e.g., in place of fixed contact information). Execution of the script can result in the presentation of recyclable contact information that is associated with the content sponsor. The recyclable contact information can be of the form of a telephone number from a pool of telephone numbers that are associated with the content sponsor. Subsequent views of the landing page can result in the presentation of the same recyclable contact information, new recyclable contact information, or fixed contact information, depending on the circumstances, as will be discussed in greater detail below. The content sponsor can be associated with a campaign that includes an advertisement creative that has a link to the landing page.

In some implementations, when a request for content is received by a content management system, for example, the advertisement creative associated with the campaign for the content sponsor can be presented. The advertisement, for example, can be presented on the client device. User interaction with the advertisement can include, for example, selection of the link to the landing page. This selection can cause, for example, a call to the landing page. In some implementations, the call can include a call to a URL for the landing page where the URL includes not only the location of the landing page but also a token. For example, selecting the landing page link can result in the execution of a small piece of code that appends a token to the URL for the landing page, and a page request for landing page URL (including the token) can be sent. In some implementations, the token can be generated, for example, at the time that the advertisement is served to the user (e.g., generated by a content management system). The token can include, for example, an impression identifier associated with the presented advertisement or information that can be used to identify the impression. The information can include, for example, identification of the content sponsor, the advertisement, and the time that the advertisement was presented).

In some implementations, rendering the landing page on the client device can cause execution of the script (i.e., the script provided to the content sponsor originally so as to support dynamic recyclable contact information presentation). Execution of the script, for example, can include a check to see if a token has been received (e.g., included in the URL) indicating that this is a first request associated with recyclable contact information. If the token exists, for example, then a request for recyclable contact information can be made by sending the token and the request to a service. In return, recyclable contact information and time-out information are received, and the information can be stored in an identifier (e.g., a cookie) on the client device.

In some implementations, if there is not a token, then a check can be made to determine if the identifier (e.g., cookie) already exists on the client device. For example, when a cookie exists, then the time-out information can be checked to determine if recyclable contact information previously retrieved can be re-used. If the request is within the time-out period, for example, then the recyclable contact information that was previously received can be re-used (e.g., re-shown on the landing page). Otherwise, a new request for recyclable contact information can be made. If neither a token nor an identifier exists, then fixed contact information (e.g., a fixed telephone number) can be shown.

Referring now to FIG. 1, a block diagram of an example environment 100 for delivering content is shown. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, the content management system 110 can provide (e.g., to a requesting device 106a) a resource 119 with recyclable contact information and an identifier for matching the resource to an action on a requesting source item. For example, the resource 119 can be a landing page that displays a recyclable telephone number. The landing page can correspond to (i.e., was linked to from) an advertisement that was presented to a user and that included a link to the landing page. Upon interaction by the user with the link, the landing page can be presented to the user. Matching the resource to the requesting source item can be used, for example, for conversion tracking.

The environment 100 can include plural data stores, which can be stored locally by the content management system 110, stored somewhere else and accessible using the network 102, generated as needed from various data sources, or some combination of these. A data store of recyclable contact information 130, for example, can include information that associates a pool of recyclable contact information (e.g., a recyclable telephone number) to a specific content sponsor (e.g., advertiser). The recyclable contact information 130 can, once assigned, be associated with time-out information, e.g., that can be used to determine when specific recyclable contact information is still valid or when recyclable contact information is expired and may require the generation of new recyclable contact information.

A repository of resources 132, for example, can include resources such as eligible content items (e.g., advertisements) that can be provided in response to requests for content. Scripts 131, for example, can include scripts stored in landing pages or other resources 132 for generating recyclable contact information when the resources are rendered.

The content management system 110 can include plural engines, some or all of which may be combined or separate, and may be co-located or distributed (e.g., connected over the network 102). A contact information service 120, for example, can provide recyclable contact information and time-out information in response to a request. The requests can be generated by a script that executes when a landing page is rendered, such as when a landing page is requested to be presented (e.g., such as after a selection of the landing page link that is included in an advertisement that is presented to a user). The execution of the script can produce a request for recyclable contact information that is provided to the contact information service 120. The execution of the script can include determining when fixed or recyclable contact information should be provided with a resource (the landing page), requesting recyclable contact information (e.g., telephone number) from the contact information service 120, receiving recyclable contact information and time-out information from the contact information service 120, and storing the recyclable contact information and the time-out information in, or associated with, an identifier (e.g., a cookie that will be loaded on a device associated with a user as a result of the presentation of the landing page to the user). In some implementations, requests provided to the contact information service 120 can include a token that can used by the contact information service 120 to identify an impression (e.g., a specific impression of content associated with a content sponsor). Tokens are discussed in greater detail below. Time-out information provided by the contact information service 120 can identify, for example, one or more time intervals that control or are used when assigning, using and expiring recyclable contact information. In some implementations, when assigning recyclable contact information (e.g., a forwarding telephone number), the contact information service 120 can preferably attempt to select recyclable contact information from a pool that has previously been assigned to that content sponsor. An example of an assignment of recyclable contact information to a content sponsor is described in co-pending U.S. patent application Ser. No. 14/015,451, the contents of which are specifically incorporated herein by reference.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smart-phones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, telephone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the universal resource locator (URL) of the webpage. Search results pages can also include one or more slots in which other content items (e.g., ads) can be presented. In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals, behavioral signals, or other signals derived from a user profile.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation (or selection or other interaction with) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as republishing or sharing the content item. Other actions that constitute a conversion can also be used.

Figure 2:
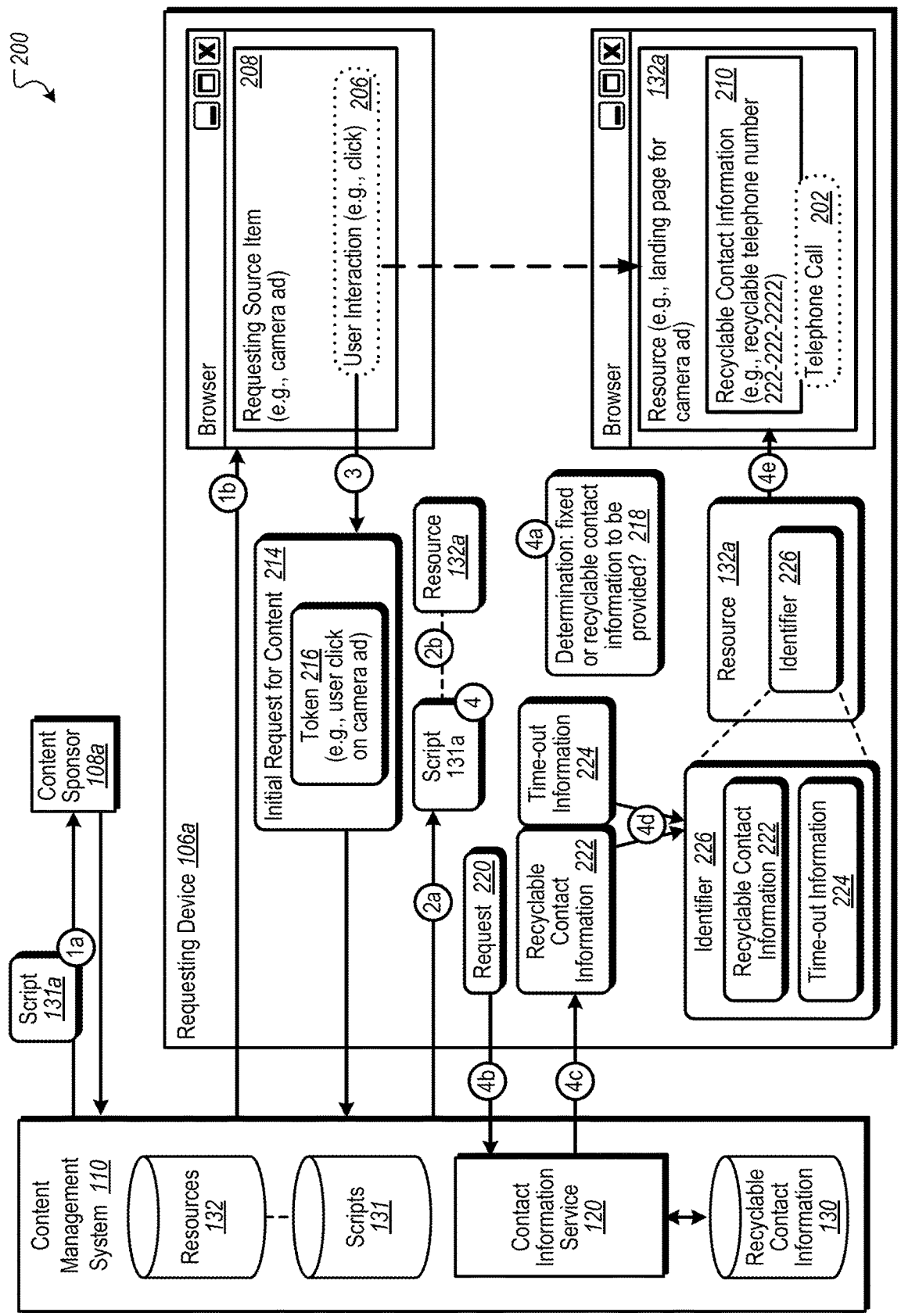
FIG. 2 shows an example system for dynamically assigning and linking recyclable telephone numbers to match a telephone call made on a resource to a user interaction made on a requesting source item.

FIG. 2 shows an example system 200 for dynamically assigning and linking recyclable contact information (e.g., telephone numbers) and to associate a contact (e.g., a telephone call 202) made on/by a resource 132a to a user interaction 206 (e.g., associated with an impression). For example, the resource 132a can be a landing page (e.g., a camera-related web page), and the user interaction 206 can be an ad click made on a requesting source item 208 (e.g., a camera advertisement). While examples provided herein include telephone numbers as examples of contact information, other types of contact information are also possible, e.g., email addresses. The following stages are used to describe activities associated with assigning, using, and linking recyclable contact information, such as by the system 200.

At stage 1a, for example, a script 131a can be provided by an entity (e.g., by the content management system 110) to a content sponsor 108a for inclusion in a resource (e.g., a landing page). This can occur, for example, if the content sponsor 108a wants dynamic assignment of contact information in a landing page (e.g., a landing page associated with an advertisement). The script 131a can be provided, for example, so as to be executed when the landing page is rendered on a client device (e.g., the requesting device 106a). For example, the script can replace a fixed telephone number in the landing page that is associated with an advertisement campaign. In some implementations, the script 131a can be a JavaScript™ function call, embedded instructions, or some other mechanism for dynamically requesting recyclable contact information (e.g., a telephone number) in real time. The content sponsor 108a can provide the landing page (containing the script 131a) to storage medium associated with a hosting server for the resource.

At stage 1b, for example, the requesting device 106a can receive a content item such as the requesting source item 208 (e.g., a camera advertisement) for display in a browser. The advertisement, for example, can include a link to a resource 132a (e.g., camera landing page).

At stage 2a, for example, the requesting device 106a can receive the script 131a for execution when the resource 132a is rendered on the requesting device 106a. For example, the script 131a can be a snippet of code that replaces the fixed telephone number in the code that renders the landing page. Receipt of the script 131a can occur, for example, at a time at which the resource 132a is requested and received.

At stage 2b, for example, the script 131a can be stored in association with the resource 132a (e.g., the landing page for the camera advertisement).

At stage 3, for example, an initial request 214 for the resource (e.g., the camera advertisement's landing page) is received. For example, the request can occur as a result of the user interaction 206, e.g., the user clicking on the camera advertisement. The request 214 can include a token 216 that identifies a requesting source item (e.g., the camera advertisement) that was interacted with by a user to generate the initial request.

At stage 4, for example, the script can be executed. For example, the requesting device 106a can execute the script 131a. In some implementations, execution of the script 131a can include the following sub-stages.

At stage 4a, for example, a determination is made (218) when fixed or recyclable contact information should be provided with the resource. For example, the determination can include whether to provide a fixed telephone number associated with the content sponsor 108a (e.g., 111-111-1111) or a recyclable telephone number (e.g., 222-222-2222) should be displayed on the landing page.

At stage 4b, for example, when recyclable contact information should be provided, the requesting device 106a can request (220) recyclable contact information from the contact information service 120. For example, the request 220 can be a request to provide a recyclable, forwarding telephone number to be displayed on the landing page linked to from the camera advertisement. In some implementations, the request 220 can include providing the token 216 to the contact information service 120. The token can be provided, for example, for use by the contact information service 120 to identify the content sponsor 108a. In some implementations, the contact information service 120 can verify that the token is valid, e.g., that it has not expired or otherwise unauthorized. In some implementations, if the token is valid, a unique identifier (e.g., impression ID) associated with the requesting source item can be determined.

At stage 4c, for example, the requesting device 106a can receive, from the contact information service 120, recyclable contact information 222 (e.g., a recyclable telephone number) for the content sponsor 108a and time-out information 224. In this example, the time-out information 224 can include, for example, the current time and an amount of time that the recyclable contact information 222 that is provided is valid. The time-out enables the local device (i.e., the client device) to reuse previously retrieved recyclable contact information 222 in certain circumstances (such as when the resource/landing page is rendered again in a short amount of time and within the parameters defined by the time out information). In some implementations, the recyclable telephone number can be a forwarding telephone number selected by the contact information service 120 from a large pool of recyclable telephone numbers, and recyclable telephone number can be configured to forward to the content sponsor's real telephone number.

At stage 4d, for example, the requesting device 106a can store the recyclable contact information 222 and the time-out information 224 in an identifier 226. In some implementations, the identifier 226 can be a cookie.

At stage 4e, for example, the identifier 226 can be stored on the requesting device 106a, and the resource 132a can be provided, including the recyclable contact information 210 responsive to the initial page request 214. In some implementations, the recyclable contact information 210, e.g., a forwarding telephone number, can be a clickable link or other control that can launch a dialer, such as on smartphones or other devices capable of making a call.

Figure 3:
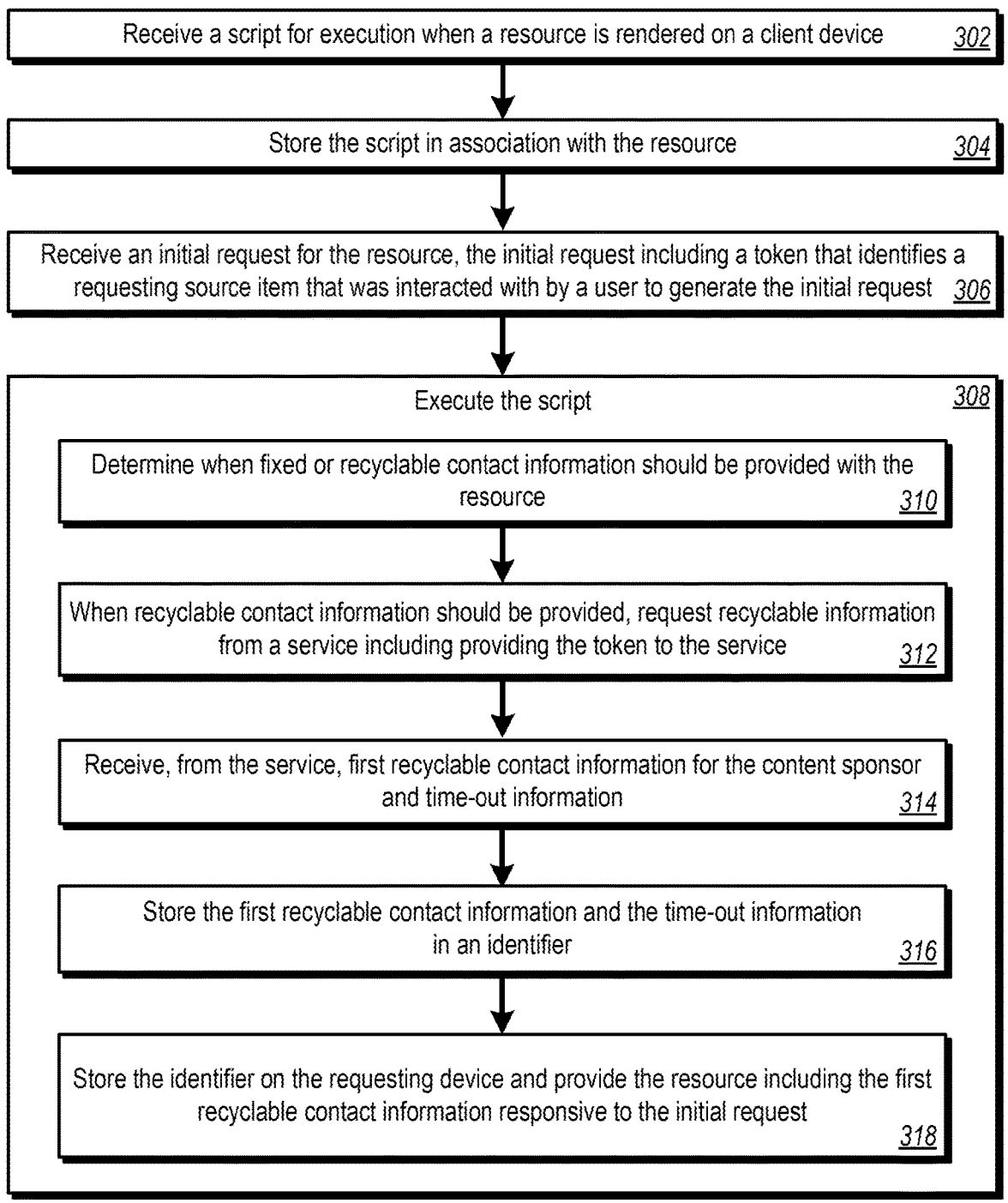
FIG. 3 is a flowchart of an example process for providing recyclable contact information with a resource.

FIG. 3 is a flowchart of an example process 300 for providing recyclable contact information with a resource. In some implementations, the requesting device 106a (e.g., using information received from the content management system 110) can perform stages of the process 300 using instructions that are executed by one or more processors. FIGS. 1-2 are used to provide example structures for performing the steps of the process 300.

A script is received (302). The script is for execution when a resource is rendered on a client device. For example, the requesting device 106a can receive the script 131a from the content management system 110 for subsequent execution when the associated resource 132a (e.g., the landing page for the camera advertisement) is rendered on the requesting device 106. In this example, execution of the script can replace a telephone number displayed on the landing page with a recyclable telephone number.

The script is stored in association with the resource (304). For example, the requesting device 106a can store the script 131a, the storage being in association with the resource 132a (e.g., the landing page for the camera advertisement). In some implementations, storing the script can further include identifying a telephone number in the resource and replacing the telephone number with a function call to call the service and request recyclable contact information rather than present the telephone number.

An initial request for the resource is received (306). The request can include a token that identifies a requesting source item that was interacted with by a user to generate the initial request. As an example, the request 214 can be a request for the resource 132a.

In some implementations, the resource can be a landing page, and the initial request can be generated by an interaction by the user with an advertisement that includes a link to the landing page. The request 214, for example, can be a request for the camera advertisement's landing page that is generated as a result of the user interaction 206 (e.g., the user clicking on the camera advertisement). As described above, the request 214 can include the token 216 that identifies, for example, the camera advertisement that was interacted with by a user to generate the initial request.

In some implementations, the request can include a URL for the landing page with the token appended thereto. For example, user interaction with (e.g., a click on) the camera advertisement can result in sending, within the request 214, the URL for the resource 132a (e.g., a landing page associated with the camera advertisement). The URL can contain the token 216 that identifies the impression associated with the user interaction 206.

In some implementations, the token can identify an impression of the requesting source item. As an example, the token 216 can include a unique impression identifier associated with the impression of the requesting source item 208 (e.g., the camera advertisement).

In some implementations, the token can be used to provide a security-related mechanism. For example the token can include information used to securely verify that the token was generated for the resource. In some implementations, the token can identify a content sponsor and allocation profile information. For example, an allocation profile information can identify one or more entries for call tracking, such as including the impression identifier of the requesting resource, the forwarding/recyclable telephone number that is assigned, and the content sponsor's telephone number. This information can be used, for example, to ensure that the forwarding/recyclable number calls the correct content sponsor's telephone number, and associates the telephone call to the correct content sponsor identifier. In some implementations, the token can be encrypted and signed with a symmetric cypher.

The script is executed (310). For example, the requesting device 106a can execute the script 131a, e.g., using script execution functionality of the browser. In some implementations, step 310 and execution of the script 131a includes execution of sub-steps 312-320. Other sub-steps are possible.

A determination is made as to when fixed or recyclable contact information should be provided with the resource (312). The contact information is associated with a content sponsor that sponsored the resource. For example, the requesting device 106a can determine (218) when fixed or recyclable contact information associated with the content sponsor 108a should be provided with the resource 132a, e.g., the landing page associated with the camera advertisement.

When recyclable contact information should be provided, recyclable information is requested from a service including providing the token to the service (314). For example, the requesting device 106a can request (220) recyclable contact information from the contact information service 120. In some implementations, the request 220 can include the token 216 for use by the contact information service 120 in the content sponsor 108a.

In some implementations, requesting recyclable information from a service can include providing a unique key associated with the content sponsor along with the token to the service. For example, the requesting device 106a can include a unique key or identifier for the content sponsor 108a when requesting information from the contact information service 120.

First recyclable contact information for the content sponsor and time-out information are received from the service (316). For example, the requesting device 106a can receive, from the contact information service 120, recyclable contact information 222, including a recyclable telephone number (e.g., telephone number 222-222-2222) for the content sponsor 108a and time-out information 224, as described above.

The first recyclable contact information and the time-out information are stored in an identifier (318). As an example, the requesting device 106a can store the recyclable contact information 222 and the time-out information 224 in the identifier 226.

The identifier is stored on the requesting device, and the resource is provided, including the first recyclable contact information, responsive to the initial request (320). As an example, the requesting device 106a can store the identifier 226, e.g., as a cookie stored on the requesting device 106a.

Also, the requesting device 106a, for example, displays the resource 132a, e.g., the landing page associated with the camera advertisement.

In some implementations, the first recyclable contact information can be a recyclable telephone number, and providing the resource can include providing the recyclable telephone number for display in the resource. For example, the recyclable contact information 222 included with the requested resource 132a can be a recyclable telephone number displayed on the camera-related landing page.

In some implementations, the identifier can be a cookie that is stored on the requesting device which can be read/presented when the resource is rendered on the requesting device. For example, the identifier 226 that is included with the requested resource 132a can be a cookie that gets stored on the requesting device 106 in association with the resource (e.g., landing page), and information in the cookie can be used each time the resource 132a is requested.

In some implementations, the process 300 can further include steps for handling subsequent requests for the resource after the initial request. For example, the process 300 can further include receiving a second request for the resource including receiving the cookie and determining when a time between the initial request and the second request is less than a first time specified in the time-out information and less than a predetermined short time. When the time between the initial request and the second request is less than both of the first time and the predetermined short time, for example, then the first recyclable contact information can be provided along with the resource responsive to the second request. By definition, the predetermined short time is less than a time associated with the time-out information. In some implementations, the time associated with the time-out information can be selectable by the content sponsor. For example, the content sponsor 108a can select the (longer) time as part of defining the details of a campaign that includes the camera advertisement and instructions for the associated landing page. The short time can represent the amount of time that is desirable to re-use the same recyclable contact information for the sake of efficiency (e.g., so as not to require a new request for recyclable contact information from the service).

In some implementations, when the time is less than the first time specified in the time-out information, but more than the predetermined short time, the process 300 can further include requesting new recyclable contact information from the service (e.g., the contact information service 120), receiving the new recyclable contact information (e.g., telephone number 333-333-3333), storing the new recyclable contact information and the time-out information in an identifier (e.g., a cookie), providing the identifier to the requesting device for storage on the requesting device, and providing the resource (e.g., the resource 132a) including the new recyclable contact information responsive to the second request.

In some implementations, the process 300 can further include returning the first recyclable contact information to a pool of available contact information selections that are associated with the content sponsor after a predetermined amount of time. For example, if the time between a subsequent request 214 and the previous request for the same resource exceeds the (long) time of the time-out information, then the requesting device 106a can invoke the contact information service 120 to return the recyclable contact information 210 (e.g., a recyclable telephone number) to a pool of available telephone numbers in the recyclable contact information 130.

In some implementations, the process 300 can further include attributing requests after the initial request for the resource within a time specified by the time-out information to the initial request and associated interaction by the user with the requesting source item. For example, as long as the (longer) time of the time-out information is not exceeded, the system 200 can process subsequent requests 214 as being attributable to the same initial impression (i.e., associated with the same requesting source item 208).

In some implementations, the process 300 can further include providing the fixed telephone number. For example, when the requesting device 106a determines (218) that fixed contact information (e.g., telephone number 111-111-1111) should be provided, the content management system 110 can provide the resource 132 along with the (fixed) telephone number associated with, and provided by, the content sponsor 108a. For the example, the fixed contact number may be provided when a native navigation (i.e., not through the campaign link) request for the landing page is received/processed.

In some implementations, the process 300 can include mechanisms to prevent abuse by malicious users and/or automated systems. For example, a volume of traffic can be monitored, e.g., for an Internet protocol (IP) address or IP address range, relative to the same telephone numbers. If a relatively large number of clicks are detected from the same IP address, but few if any valid calls are made, service of content to those IP addresses can temporarily, or telephone forwarding can be halted for clicks from those IP addresses. Other abuse prevention mechanisms are possible.

In some implementations, content sponsors can specify that the same forwarding telephone number be used, e.g., for all advertisements in the same campaign, adgroup or other grouping. For example, information obtained using this level of granularity may be more useful to some content sponsors.

Figure 4:
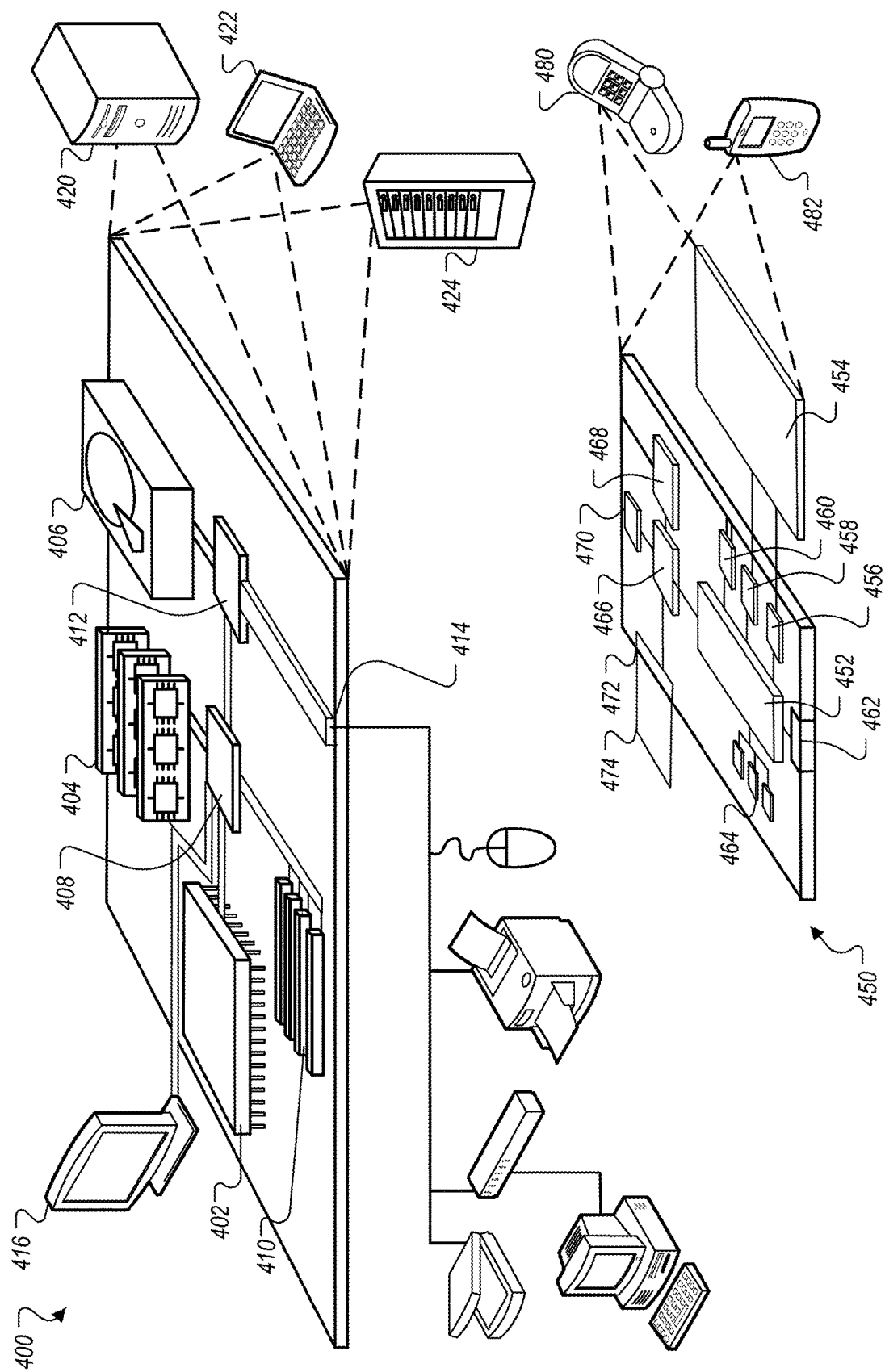
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provided as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining, by one or more processors, that recyclable contact information should be provided with a resource being rendered at a requesting device;
   in response to determining that the recyclable contact information should be provided with the resource, replacing, in a presentation of the resource, a fixed telephone number located in code that renders the resource with the recyclable contact information;
   identifying time-out information;
   combining the recyclable contact information and the time-out information in an identifier; and
   storing the identifier on the requesting device;
   receiving a request generated by a script that executes as the resource is rendered;

determining that the request was generated by the script executing within a specified amount of time following the resource being rendered at the requesting device;

in response to determining that the request was generated by the script executing within the specified amount of time following the resource being rendered at the requesting device, reusing the recyclable contact information for the request.

2. The method of claim 1, wherein the identifier is stored on the requesting device and read when subsequent requests are processed by the requesting device.

3. The method of claim 1, wherein the request is an initial request, the method further comprising:
receiving a second request including receiving the identifier;
determining when a time between the initial request and the second request is less than a first time specified in the time-out information and less than a predetermined short time; and
when the time between is less than both, providing the recyclable contact information responsive to the second request, wherein the predetermined short time is less than a time associated with the time-out information.

4. The method of claim 3, further comprising, when the time is less than the first time specified in the time-out information but more than the predetermined short time:
requesting new recyclable contact information;
receiving the new recyclable contact information;
storing the new recyclable contact information and the time-out information in the identifier;
providing the identifier to the requesting device for storage on the requesting device; and
providing a response including the new recyclable contact information responsive to the second request.

5. The method of claim 1, wherein replacing the fixed telephone number comprises generating an audible sound at the requesting device.

6. The method of claim 1, wherein replacing the fixed telephone number comprises providing visual information on a display of the requesting device.

7. The method of claim 1, wherein the resource is a landing page and the received request is generated by an interaction by a user with a content item that includes a link to the landing page.

8. A non-transitory computer-readable medium storing instructions, that when executed, cause one or more computing devices to perform operations including:
determining that recyclable contact information should be provided with a resource being rendered at a requesting device;
in response to determining that the recyclable contact information should be provided with the resource, replacing, in a presentation of the resource, a fixed telephone number located in code that renders the resource with the recyclable contact information;
identifying time-out information;
combining the recyclable contact information and the time-out information in an identifier; and
storing the identifier on the requesting device;
receiving a request generated by a script that executes as the resource is rendered;
determining that the request was generated by the script executing within a specified amount of time following the resource being rendered at the requesting device;
in response to determining that the request was generated by the script executing within the specified amount of time following the resource being rendered at the requesting device, reusing the recyclable contact information for the request.

9. The non-transitory computer-readable medium of claim 8, wherein the identifier is stored on the requesting device and read when subsequent requests are processed by the requesting device.

10. The non-transitory computer-readable medium of claim 8, wherein the request is an initial request, the operations further including:
receiving a second request including receiving the identifier;
determining when a time between the initial request and the second request is less than a first time specified in the time-out information and less than a predetermined short time; and
when the time between is less than both, providing the recyclable contact information responsive to the second request, wherein the predetermined short time is less than a time associated with the time-out information.

11. The non-transitory computer-readable medium of claim 10, the operations further including, when the time is less than the first time specified in the time-out information but more than the predetermined short time:
requesting new recyclable contact information;
receiving the new recyclable contact information;
storing the new recyclable contact information and the time-out information in the identifier;
providing the identifier to the requesting device for storage on the requesting device; and
providing a response including the new recyclable contact information responsive to the second request.

12. The non-transitory computer-readable medium of claim 8, wherein replacing the fixed telephone number comprises generating an audible sound at the requesting device.

13. The non-transitory computer-readable medium of claim 8, wherein replacing the fixed telephone number comprises providing visual information on a display of the requesting device.

14. The non-transitory computer-readable medium of claim 8, wherein the resource is a landing page and the received request is generated by an interaction by a user with a content item that includes a link to the landing page.

15. A system comprising:
one or more computing devices; and
one or more memory elements including instructions that, when executed, cause the one or more computing devices to perform operations including:
determining, by one or more processors, that recyclable contact information should be provided with a resource being rendered at a requesting device;
in response to determining that the recyclable contact information should be provided with the resource, replacing, in a presentation of the resource, a fixed telephone number located in code that renders the resource with the recyclable contact information;
identifying time-out information;
combining the recyclable contact information and the time-out information in an identifier; and
storing the identifier on the requesting device;
receiving a request generated by a script that executes as the resource is rendered;
determining that the request was generated by the script executing within a specified amount of time following the resource being rendered at the requesting device;

in response to determining that the request was generated by the script executing within the specified amount of time following the resource being rendered at the requesting device, reusing the recyclable contact information for the request.

16. The system of claim 15, wherein the identifier is stored on the requesting device and read when subsequent requests are processed by the requesting device.

17. The system of claim 15, wherein replacing the fixed telephone number comprises at least one of generating an audible sound at the requesting device and providing visual information on a display of the requesting device.

* * * * *